Dec. 19, 1961  W. S. HASTINGS  3,013,754
SIGN MOUNTING MEANS FOR A VEHICLE BUMPER
Filed Jan. 13, 1961  2 Sheets-Sheet 1
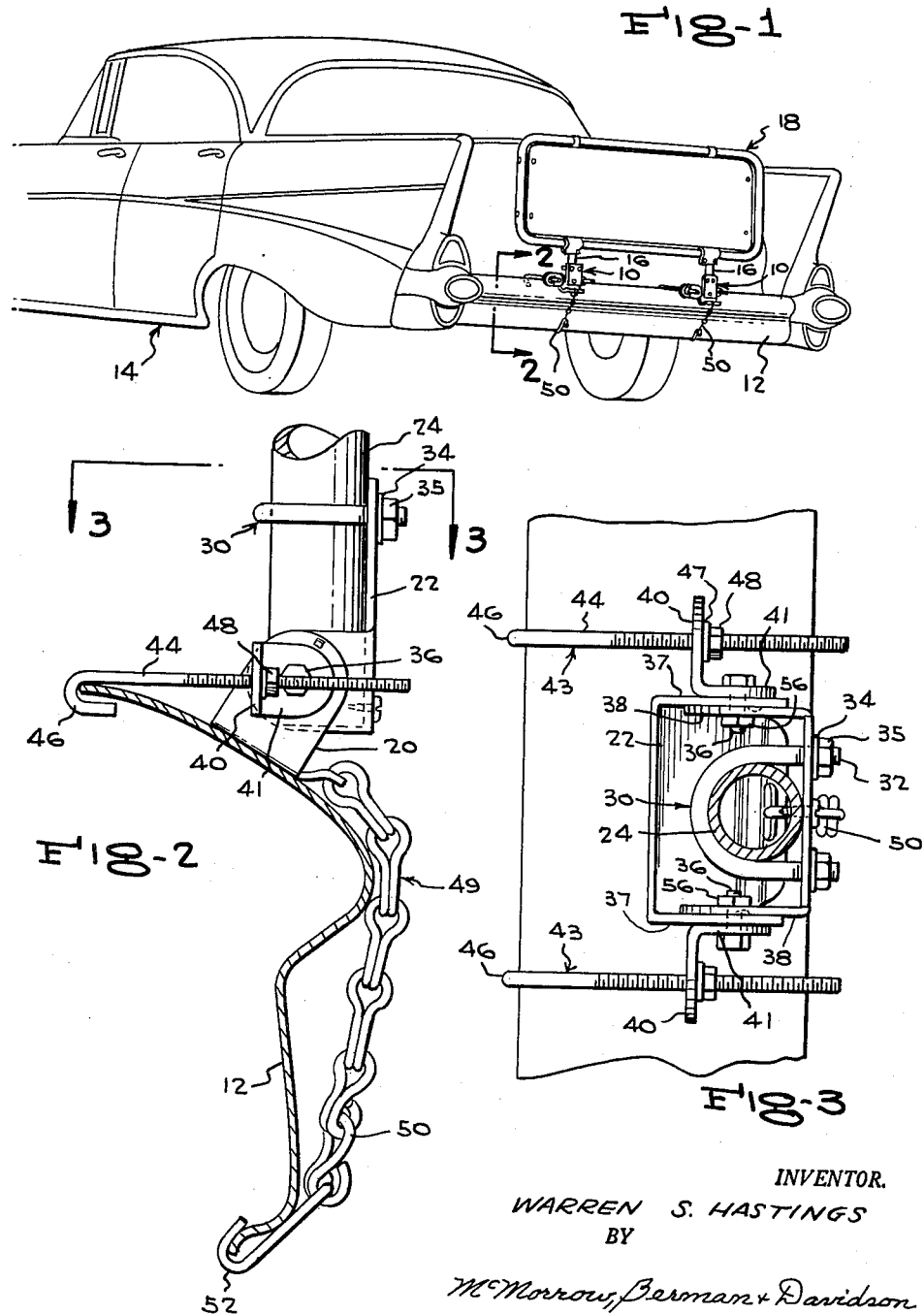
INVENTOR.
WARREN S. HASTINGS
BY
McMorrow, Berman & Davidson
ATTORNEYS Dec. 19, 1961
W. S. HASTINGS
3,013,754
SIGN MOUNTING MEANS FOR A VEHICLE BUMPER
Filed Jan. 13, 1961
2 Sheets-Sheet 2
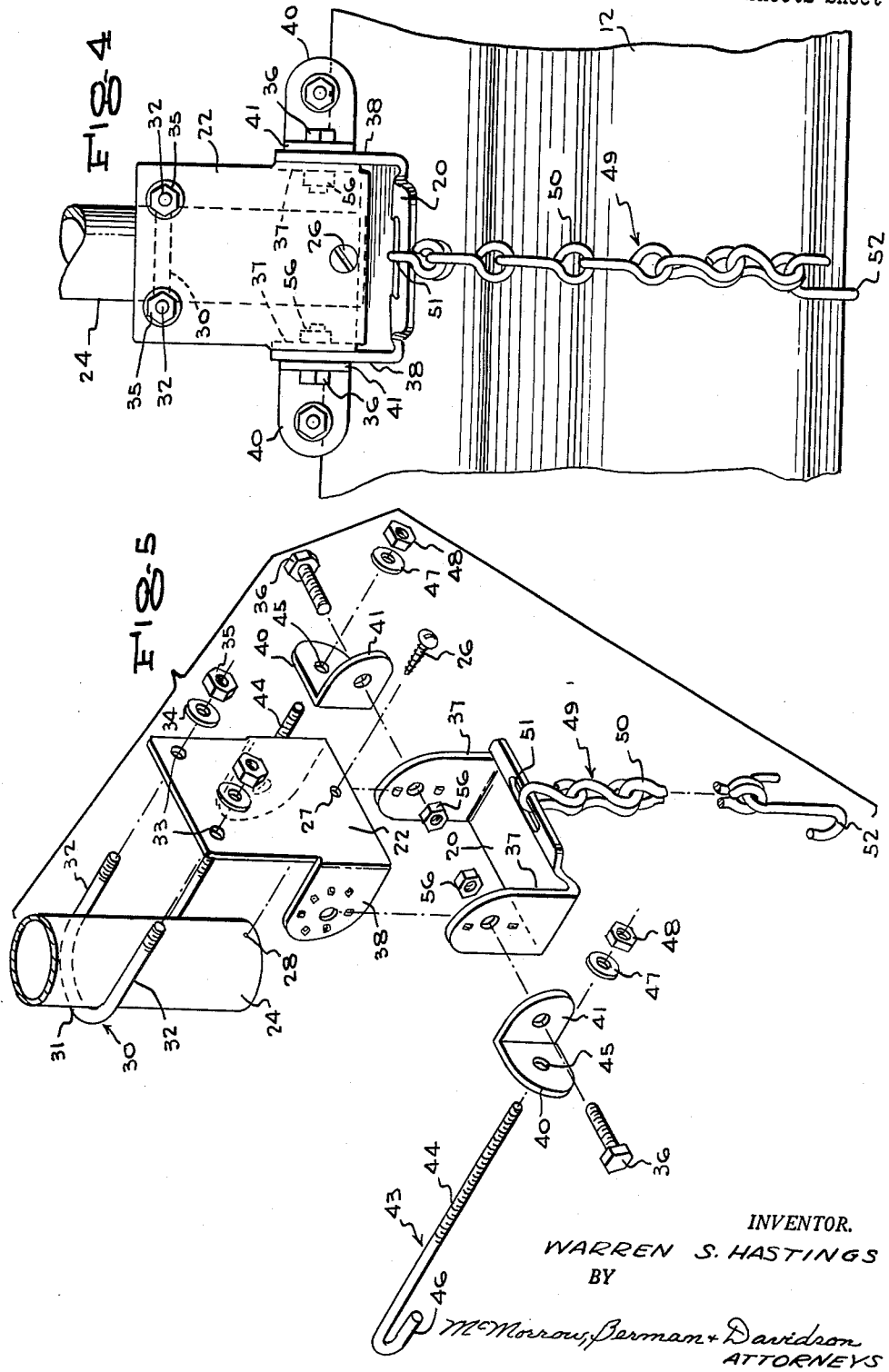
INVENTOR.
WARREN S. HASTINGS
BY
McMorrow, Berman + Davidson
ATTORNEYS

United States Patent Office 3,013,754
Patented Dec. 19, 1961

3,013,754
SIGN MOUNTING MEANS FOR A
VEHICLE BUMPER
Warren S. Hastings, 202 N. Front St., Mounds, Ill.
Filed Jan. 13, 1961, Ser. No. 82,530
4 Claims. (Cl. 248—43)

This invention has to do with a sign mounting means for vehicle bumpers.

An object of the present invention is to provide a sign mounting means which is adaptable for attachment to vehicle bumpers generally.

Another object of the present invention is to provide a sign mounting means which lends itself to attachment to vehicle bumpers with ease and facility.

A further object of the invention is to provide a sign mounting means which is simple in structure, highly efficient in action, and commercially feasible.

Other objects and advantages of the present invention will become apparent from the following description when taken in conjunction with the accompanying drawings, in which:

FIGURE 1 is an elevational view of the rear portion of an automobile with the sign mounting means of the present invention shown attached to the bumper of the automobile and with a sign supported in the mounting means;

FIGURE 2 is an enlarged view, partly in section, taken on the line 2—2 of FIGURE 1;

FIGURE 3 is a view taken on the line 3—3 of FIGURE 2;

FIGURE 4 is a fragmentary enlarged front view of the right-hand mounting means and the associated portion of the vehicle bumper of FIGURE 1; and FIGURE 5 is an exploded view of the mounting means of the present invention.

Referring to FIGURE 1 of the drawings, a pair of sign mounting means of the present invention, and indicated by the numeral 10, are shown mounted upon a bumper 12 of an automobile 14, the pair of means receiving the supporting posts 16 of a sign-containing frame 18.

Inasmuch as the two sign mounting means 10 are identical structure, only one will be specifically described. Such means comprises a saddle 20 which is positioned so as to rest upon and be supported upon the top portion of the bumper 12. Disposed in spaced relation to the saddle 20 is a backing member 22, the backing member being fixedly attached to a socket 24 which extends along one face thereof and which, as shown in FIGURE 1, receives the end portion of the support post 16 of the sign-containing frame 18. As shown in FIGURES 2 and 5, the socket 24 is in the form of an open-ended sleeve which sleeve abuts against the face of the backing member 22 and is fixedly attached to the backing member 22 by means of a threaded screw 26 which extends through a hole 27 formed in the backing member 22 and is in threaded engagement with a threaded hole 28 formed in the socket of sleeve 24, and a U-shaped tie bar 30 whose bight 31 embraces the socket or sleeve 24 has the threaded end portion of its legs 32 extending through spaced apertures 33 also provided in the backing member 22, with the projecting end portions of the legs 32 being fixedly secured to the backing member 22 by means of a washer 34 circumposed about the leg and a threaded nut 35 in threaded engagement with the threaded leg.

A horizontally-disposed pivot means connects the backing member 22 to the saddle 20 for swinging movement of the backing member about the pivot means to a position in which the socket 24 extends in an upright position, or direction. Specifically, the pivot means comprises a pair of spaced aligned horizontally-disposed pivot pins 36, the pins 36 being carried by a pair of legs 37 rising from the ends of the saddle 20 and on these pins 36 are rotatably mounted lugs 38 which project from the side edges of the backing member 22.

At least two ears 40 are each supported on the pivot means for rocking movement therearound. Specifically, each ear 40 is supported on a pivot pin 36 for rocking movement therearound by means of a knuckle 41 which is on the ear and which is rotatably supported on the pivot pin 36.

It is to be noted that the pins 36 are each in the form of a threaded bolt and to adjustably retain the lugs 38 of the backing member 22 and the knuckles 41 of the ears 40 on the threaded bolt, a threaded nut 56 is in threaded engagement with each of the threaded bolts and is turned down until it tightly engages the adjacent lug 38 of the backing member 22.

A fastening element 43 extends through and is adjustably securable to each of the ears 40 and has means on one end which is adapted to embracingly engage an edge of the top portion of the bumper 12 when the saddle 20 is positioned on the top portion of the bumper. Specifically, the fastening element 43 embodies a threaded shank 44 which extends loosely through a hole 45 provided in each of the ears 40 and a hook 46 on one end which is adapted to embracingly engage an edge of the top portion of the bumper 12 when the saddle is so positioned on the top portion of the bumper 12, the threaded shank 44 being adjustably secured to the adjacent ear 40 by means of a washer 47 encircling the shank 44 and a threaded nut 48 in threaded engagement with the shank 44.

Strap means, indicated generally by the numeral 49, is carried by the saddle 20 and has the free end provided with means which is adapted to embrace the lower end edge of the bumper 12 when the saddle 20 is positioned upon the top portion of the bumper 12 to hold the saddle in position on the bumper 12 of the vehicle 10. Specifically, the strap means 49 embodies a chain 50 which has one end attached to a side edge of the saddle 20, as at 51, and which has the other or free end provided with a hook 52 which embraces the lower end edge of the bumper 12 when the saddle 20 is positioned upon the top portion of the bumper 12.

In operation of the sign mounting means of the present invention the saddle 20 is placed upon the top portion of the bumper 12 of the vehicle 10, and the hook 52 of the chain 50 is placed so that it embracingly engages the lower end edge of the bumper 12. The nuts 56 are then loosened from the pivot bolts 36, the backing member 22 swung to a position such that the socket 24 is in the upright direction, and the ears 40 swung to a position such that the hooks 46 of the threaded shanks 44 engage the edge of the top portion of the bumper 12, whereupon the nuts 56 are then tightened against the lugs 38 on the backing member 22. Another sign mounting means of the present invention is similarly mounted upon the bumper 12 of the vehicle 10 and in spaced relation with respect to the first-mounted means. The posts 16 of the sign-containing frame 18 are then inserted in the sockets 24 of the two sign mounting means.

What is claimed is:
1. A sign mounting means for a vehicle comprising a saddle adapted to be positioned so as to rest upon and be supported upon the top portion of a bumper of a vehicle, a backing member, a socket extending along one face of and fixedly attached to said backing member adapted to receive an end portion of a supporting post of a display sign, said backing member being disposed in spaced relation to said saddle, horizontally-disposed pivot means connecting said backing member to said saddle for swinging movement of said backing member about said pivot means to a position in which said socket extends in an upright direction, at least two ears each supported on said pivot means for rocking movement therearound, a fastening element extending through and adjustably securable to each of said ears and having means on one end adapted to embracingly engage an edge of the top portion of a bumper of a vehicle when said saddle is positioned on the top portion of the bumper of said vehicle, and strap means carried by said saddle and having a free end provided with means adapted to embrace the lower end edge of a bumper of a vehicle when said saddle is positioned upon the top portion of the bumper of said vehicle to hold the saddle in position on the bumper of said vehicle.

2. A sign mounting means for a vehicle comprising a saddle adapted to be positioned so as to rest upon and be supported upon the top portion of a bumper of a vehicle, a backing member, a socket extending along one face of and fixedly attached to said backing member adapted to receive an end portion of a supporting post of a display sign, said backing member being disposed in spaced relation to said saddle, a pair of spaced aligned horizontally-disposed pivot pins connecting said backing member to said saddle for swinging movement of said backing member about said pivot pins to a position in which said socket extends in an upright direction, an ear supported on each of said pivot pins for rocking movement therearound, a fastening element extending through and adjustably securable to each of said ears and having means on one end adapted to embracingly engage an edge of the top portion of a bumper of a vehicle when said saddle is positioned on the top portion of the bumper of said vehicle, and strap means carried by said saddle and having a free end provided with means adapted to embrace the lower end edge of a bumper of a vehicle when the said saddle is positioned upon the top portion of the bumper of said vehicle to hold the saddle in position on the bumper of said vehicle.

3. A sign mounting means for a vehicle comprising a saddle adapted to be positioned so as to rest upon and be supported upon the top portion of a bumper of a vehicle, a backing member, a socket extending along one face of and fixedly attached to said backing member adapted to receive an end portion of a supporting post of a display sign, said backing member being disposed in spaced relation to said saddle, a pair of spaced aligned horizontally-disposed pivot pins connecting said backing member to said saddle for swinging movement of said backing member about said pivot pins to a position in which said socket extends in an upright direction, an ear supported on each of said pivot pins for rocking movement therearound, a fastening element embodying a threaded shank extending through and adjustably securable to each of said ears and having a hook on one end adapted to embracingly engage an edge of the top portion of a bumper of a vehicle when said saddle is positioned on the top portion of the bumper of said vehicle, and strap means carried by said saddle and having a free end provided with a hook adapted to embrace the lower end edge of a bumper of a vehicle when the said saddle is positioned upon the top portion of the bumper of said vehicle to hold the saddle in position on the bumper of said vehicle.

4. A sign mounting means for a vehicle comprising a saddle adapted to be positioned so as to rest upon and be supported upon the top portion of a bumper of a vehicle, a backing member, a socket extending along one face of and fixedly attached to said backing member adapted to receive an end portion of a supporting post of a display sign, horizontally-disposed pivot means connecting said backing member to said saddle for swinging movement of said backing member about said pivot means to a position in which said socket extends in an upright direction, at least two ears each supported on said pivot means for rocking movement therearound, a fastening element extending through and adjustably securable to each of said ears and having means on one end adapted to embracingly engage an edge of the top portion of a bumper of a vehicle when said saddle is positioned on the top portion of the bumper of said vehicle, and strap means embodying a chain carried by said saddle and having a free end provided with a hook adapted to embrace the lower end edge of a bumper of a vehicle when the said saddle is positioned upon the top portion of the bumper of said vehicle to hold said saddle in position on the bumper of said vehicle.

References Cited in the file of this patent
UNITED STATES PATENTS

| | | |
|---|---|---|
| 2,693,369 | Gross | Nov. 2, 1954 |
| 2,772,099 | Smith | Nov. 27, 1956 |
| 2,816,377 | Hastings | Dec. 17, 1957 |